(12) United States Patent
Shen et al.

(10) Patent No.: US 11,026,072 B2
(45) Date of Patent: Jun. 1, 2021

(54) SYSTEM AND METHOD FOR AUTOMOTIVE WI-FI ACCESS AND CONNECTION

(71) Applicants: Xuemin Shen, Waterloo (CA); Wenchao Xu, Waterloo (CA); Haibo Zhou, Waterloo (CA)

(72) Inventors: Xuemin Shen, Waterloo (CA); Wenchao Xu, Waterloo (CA); Haibo Zhou, Waterloo (CA)

( * ) Notice: Subject to any disclaimer, the term of this patent is extended or adjusted under 35 U.S.C. 154(b) by 0 days.

(21) Appl. No.: 16/346,023

(22) PCT Filed: Oct. 31, 2017

(86) PCT No.: PCT/CA2017/051292
§ 371 (c)(1),
(2) Date: Apr. 29, 2019

(87) PCT Pub. No.: WO2018/081894
PCT Pub. Date: May 11, 2018

(65) Prior Publication Data
US 2019/0268741 A1    Aug. 29, 2019

Related U.S. Application Data

(60) Provisional application No. 62/496,855, filed on Nov. 1, 2016.

(51) Int. Cl.
*H04W 4/44* (2018.01)
*H04W 4/48* (2018.01)
*H04W 76/14* (2018.01)
*H04W 8/26* (2009.01)
*H04W 28/22* (2009.01)
(Continued)

(52) U.S. Cl.
CPC .............. *H04W 4/44* (2018.02); *H04W 4/48* (2018.02); *H04W 8/26* (2013.01); *H04W 12/062* (2021.01); *H04W 12/71* (2021.01); *H04W 28/22* (2013.01); *H04W 48/12* (2013.01);
(Continued)

(58) Field of Classification Search
CPC ...................................................... H04W 4/44
See application file for complete search history.

(56) References Cited

U.S. PATENT DOCUMENTS 9,674,880 B1 *   6/2017   Egner ................. A61B 5/1451
2012/0179790 A1 * 7/2012   Kim ....................... H04L 67/22
                                                            709/220
(Continued)

*Primary Examiner* — John D Blanton

(57) ABSTRACT

A system and method for providing improved in-vehicle wireless connection to roadside access devices for connection to network is described. The system includes an in-vehicle device, one or more roadside access devices, a cloud management server, and backhaul Internet access connection. The roadside access device includes in its broadcasted beacon frame message information required by an in-vehicle device to set network connection parameters. The in-vehicle device automatically connects to roadside access devices for access to the network, using information included in the broadcasted beacon frame message. The in-vehicle device also manages and categorizes data traffic, maps user priority assigned to data traffic to network transmission priority, and adapts transmission rates to network condition, such as backhaul network bandwidth available, number of mobile users connected to the same roadside access devices and data traffic load, among others.

20 Claims, 13 Drawing Sheets

(51) Int. Cl.
*H04W 48/12* (2009.01)
*H04W 72/12* (2009.01)
*H04W 76/10* (2018.01)
*H04W 12/062* (2021.01)
*H04W 12/71* (2021.01)

(52) U.S. Cl.
CPC ....... *H04W 72/1242* (2013.01); *H04W 76/10* (2018.02); *H04W 76/14* (2018.02)

(56) References Cited

U.S. PATENT DOCUMENTS

| | | | | |
|---|---|---|---|---|
| 2013/0128735 A1* | 5/2013 | Li | ............................ | H04L 47/25 370/230 |
| 2013/0176897 A1* | 7/2013 | Wang | ....................... | H04L 12/06 370/254 |
| 2014/0140288 A1* | 5/2014 | Jung | ..................... | H04W 48/20 370/329 |

* cited by examiner

SYSTEM AND METHOD FOR AUTOMOTIVE WI-FI ACCESS AND CONNECTION

FIELD OF INVENTION

The invention relates generally to the field of provision of wireless network access to in-vehicle devices. In particular, the invention relates to system and method for providing improved automatic wireless connection to roadside access units for connection to network and access to Internet, and providing connection management to improve user experience.

BACKGROUND OF INVENTION

In recent years, there has been a tremendous increase in mobile traffic from vehicle users. Providing Internet access to these users is desired. Majority of mobile access has been provided by cellular networks, which tends to cause network congestion. It is desirable to offload the data traffic from congested cellular networks. Wi-Fi™ is considered to be a leading technology. However, the process of manually connecting to a Wi-Fi hotspot tends to be cumbersome, which may make it impractical to deploy and operate, especially for mobile users in moving vehicles. While certain industry standards, such as Hotspot 2.0 (HS2.0), have been proposed to provide a framework for addressing automated connection for mobile users, such standards necessarily leave out details for implementation. Aside from automated connection, it is also desirable that network overhead may be reduced for automotive users, so that drive-by vehicles can quickly connect to the network and gain access to Internet. It is also desirable that network activities can be monitored and managed by remote operators and that network performance, i.e., quality of service ("QoS"), can be maintained or improved for users in fast moving vehicles.

The forgoing creates challenges and constraints for system and method for provision of wireless network access to in-vehicle devices. There is therefore a need for an improved system and method for providing improved automatic wireless connection to roadside access units for connection to network and access to Internet, and providing connection management to improve user experience as compared to the existing art. It is an object of the present invention to mitigate or obviate at least one of the above mentioned disadvantages.

SUMMARY OF INVENTION

The present invention is directed to a system and method for providing improved in-vehicle wireless connection to roadside access devices for connection to network. The system includes an in-vehicle device, one or more roadside access devices, a cloud management server, and backhaul Internet access connection. The roadside access device includes in its broadcasted beacon frame message information required by an in-vehicle device to set network connection parameters. The in-vehicle device automatically connects to roadside access devices for access to the network, using information included in the broadcasted beacon frame message. The in-vehicle device also manages and categorizes data traffic, maps user priority assigned to data traffic to network transmission priority, and adapts transmission rates to network condition, such as backhaul network bandwidth available, number of mobile users connected to the same roadside access devices and data traffic load, among others.

In a first aspect of the invention, a method of connecting an in-vehicle device inside a vehicle to a telecommunication network through a roadside hotspot ("RSH") device connected to the telecommunication network is provided. The method includes the steps of the roadside hotpot device, prior to receiving any request from the in-vehicle device, broadcasting beacon frame messages including tagged information, the tagged information including wireless network connection parameters, information of current network condition and identifier of the roadside hotpot device, the in-vehicle device receiving the RSH beacon frame messages to detect the tagged information and extract wireless network connection parameters, information of current network condition and identifier of the roadside hotpot device included in the tagged information, the in-vehicle device verifying support for wireless connection to the RSH by checking the wireless network connection parameters and the identifier of the roadside hotpot device, upon successful verification, the in-vehicle device cooperating with the roadside hotpot device to associate with the roadside hotspot device using an identifier of the in-vehicle device, the in-vehicle device requesting user authentication by the roadside hotspot device or a cloud management server, the roadside hotpot device sending a confirmation message to the in-vehicle device to confirm successful authentication of the in-vehicle device, and upon receiving the confirmation message, the in-vehicle device setting up a wireless connection to the roadside hotspot device in accordance with the wireless network connection parameters and the information of current network condition already provided by and included in the tagged information received from the RSH prior to the network connection session.

The method may further include the steps of the in-vehicle device computing a value of a utility function based on inputs related to network transmission capacity, and the in-vehicle device increasing its link rate of the wireless connection only if the computed value of the utility function indicates a network transmission capacity capable of supporting the increased link rate, wherein the inputs related to network transmission capacity may include at least one of transmission bandwidth of the backhaul network, load of the roadside hotspot device, and cache status of transmission queue at RSH.

As another feature of this aspect of the invention, the method may further include the steps of the in-vehicle device categorizing and tagging outgoing data traffic according to tolerance to delayed transmission, the in-vehicle device transmitting outgoing data traffic more tolerant to delay only after transmission of all outgoing data traffic less tolerant to delay being completed, the roadside hotspot device mapping the tagged delay tolerance of the outgoing data traffic to priority values of network transmission, more delay tolerant being mapped to lower priority, and the roadside hotspot device transmitting lower priority outgoing data traffic from the in-vehicle device only after transmission of all higher priority outgoing data traffic being completed.

In a second aspect, there is provided a method of a roadside hotspot device connecting an in-vehicle device to a telecommunication network that is connected to the roadside hotspot device. The method includes the steps of the roadside hotspot device: prior to receiving any request from the in-vehicle device, broadcasting beacon frame messages for reception by the in-vehicle device, the beacon frame messages including wireless network connection parameters, information of current network condition and identifier of the roadside hotpot device, associating the in-vehicle device upon receiving an association request from the in-vehicle device, the association request including an identifier of the in-vehicle device, authenticating the in-vehicle device upon receiving an authentication request from the in-vehicle device and sending a confirmation message to the in-vehicle device to confirm successful authentication, establishing a wireless connection with the in-vehicle device in accordance with the wireless network connection parameters and the information of current network condition, already sent to the in-vehicle device prior to the network connection session and included in the beacon frame messages to connect the in-vehicle device to the telecommunication network.

As a feature of this aspect of the invention, the method may further includes the steps of the roadside hotspot device sending a unique index to the in-vehicle device during association, wherein the roadside hotspot device establishes the wireless connection with the in-vehicle device using a subset of network connection parameters determined by the in-vehicle device based on the unique index.

As another feature of this aspect of the invention, the method may further include the steps of extracting a priority tag from data traffic received from the in-vehicle device and determining priority value associated with each data frame of the data traffic, and transmitting data frames associated with lower priority value after completion of transmission of data frames associated with higher priority value that have been received by the roadside hotspot device.

As yet another aspect of the invention, there is provided a roadside hotspot device for connecting an in-vehicle device to a telecommunication network that is connected to the roadside hotspot device. The roadside hotspot device includes a wireless network interface for connecting to the in-vehicle device over a wireless connection, a backhaul network interface for connecting the roadside hot spot device to the telecommunication network, a datapath forwarding unit to forward data traffic between the wireless network interface and the backhaul network interface, a data storage, a priority mapping unit having stored on the data storage a pre-defined mapping scheme, the priority mapping unit extracting a user priority tag from data traffic received from the in-vehicle device and assigning a network transmission priority value according to the pre-defined mapping scheme to the data traffic forwarded to backhaul network interface by the datapath forwarding unit, a connection manager, the connection manager cooperating with the in-vehicle device to establish the wireless connection, and a programmed microprocessor, the programmed processor directing mapping operations of the priority mapping unit and wireless connection operation of the connection manager when executing computer program instructions stored on the data storage.

As yet another aspect of the invention, there is provided a method of an in-vehicle device connecting to a telecommunication network through a roadside hotspot ("RSH") device connected to the telecommunication network. The method comprising the steps of: prior to sending any connection request to the RSH, receiving RSH beacon frame messages broadcasted by the roadside hotspot device and extracting wireless network connection parameters, information of current network condition and identifier of the roadside hotpot device included in the RSH beacon frame messages, verifying support for wireless connection to the RSH by checking the wireless network connection parameters and the identifier of the roadside hotpot device, upon successful verification, cooperating with the roadside hotpot device to associate therewith using an identifier of the in-vehicle device, transmitting an authentication request to the roadside hotspot device, and upon receiving a confirmation message from the roadside hotpot device of successful authentication, setting up a wireless connection to the roadside hotspot device in accordance with the wireless network connection parameters and the information of current network condition already received in the RSH beacon frame messages prior to the network connection session.

As a feature of this aspect of the invention, the method may further include the steps of extracting a unique index from association messages received from the roadside hotspot device during association, and determining a subset of network connection parameters based on the unique index from the network connection parameters included in the beacon frame messages, wherein the wireless connection is established using the subset of network connection parameters.

As another feature of this aspect of the invention, the method may further include the steps of computing a value of a utility function based on inputs related to network transmission capacity, and increasing link rate of the wireless connection only if the computed value of the utility function indicates a network transmission capacity capable of supporting the increased link rate, wherein the inputs of the utility function may include at least one of transmission bandwidth of the backhaul network, load of the roadside hotspot device, and cache status of transmission queue at the RSH.

As yet another feature of this aspect of the invention, the method may further include the steps of categorizing and tagging outgoing data traffic according to tolerance to delayed transmission, and transmitting outgoing data traffic more tolerant to delay only after transmission of all outgoing data traffic less tolerant to delay being completed.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
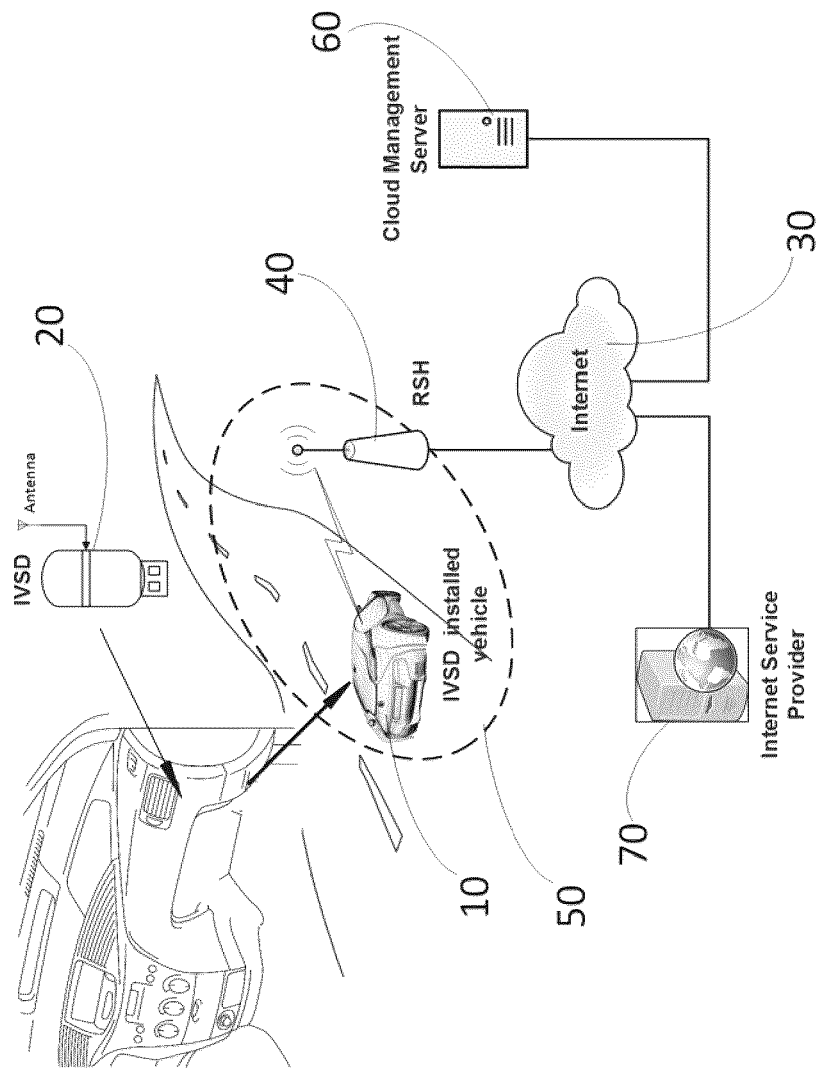
FIG. 1 is a schematic diagram showing a networked system providing wireless network access to in-vehicle user devices in an exemplary configuration.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The present invention relates to a system and method for providing improved in-vehicle wireless connection to roadside access devices for connection to network and access to Internet, and providing connection management to improve in-vehicle user experience. In one embodiment of the invention, the system includes an in-vehicle device, one or more roadside access devices along a road, a cloud management server, and backhaul Internet access connection. The roadside access devices include in the broadcasted beacon frame messages information that an in-vehicle device can use to set up wireless network connection. The in-vehicle device automatically connects to roadside access devices for access to the network, using information already included in the beacon frame messages, such as Internet address, link rate, current data traffic load, available backhaul network bandwidth, etc., without having to obtain such information again during connection process from the roadside access device. The in-vehicle device also manages and categorizes data traffic, maps user priority assigned to data traffic to network transmission priority, and adapts transmission rates to network conditions, such as backhaul network bandwidth available, number of mobile users connected to the same roadside access devices and data traffic load, among others, for improved network performance. The in-vehicle device may be a device that includes applications requiring network access, or may be an in-vehicle smart device that connects to roadside access devices and use in-vehicle wired or wireless connections to provide an in-vehicle network connection for other in-vehicle devices. Roadside access devices serve as the network gateway between vehicle users and backhaul network, provide the required backhaul network access, enable Wi-Fi connection with in-vehicle devices, support information query, and provide vehicular data traffic priority mapping, among others. The cloud management server is connected to roadside access devices via telecommunication network, such as Internet, to provide remote management ability (e.g., AAA, or authenticate, authorization, accounting functions). The backhaul Internet connection to roadside access devices provides the Internet access for in-vehicle users.

By way of a general overview, FIG. 1 shows a simplified view of a system in which a mobile user in a vehicle 10 utilizing an in-vehicle smart device 20 ("IVSD") for accessing Internet or other telecommunication networks 30 bridged by a roadside access device 40, or roadside hotspot ("RSH") device, inside its coverage area 50. The network activities are managed and monitored by a cloud management server 60 ("MS") that is located in the network "cloud", i.e., a location accessible over network 30 but without any requirement to be at any particular physical location. Access to Internet services, i.e., access to telecommunication network 30, is provided by Internet service provider 70, which may also collect network usage statistics for user fee calculation purposes. Each of these devices and subsystems is further described in reference to FIG. 2 to FIG. 4.

Figure 2:
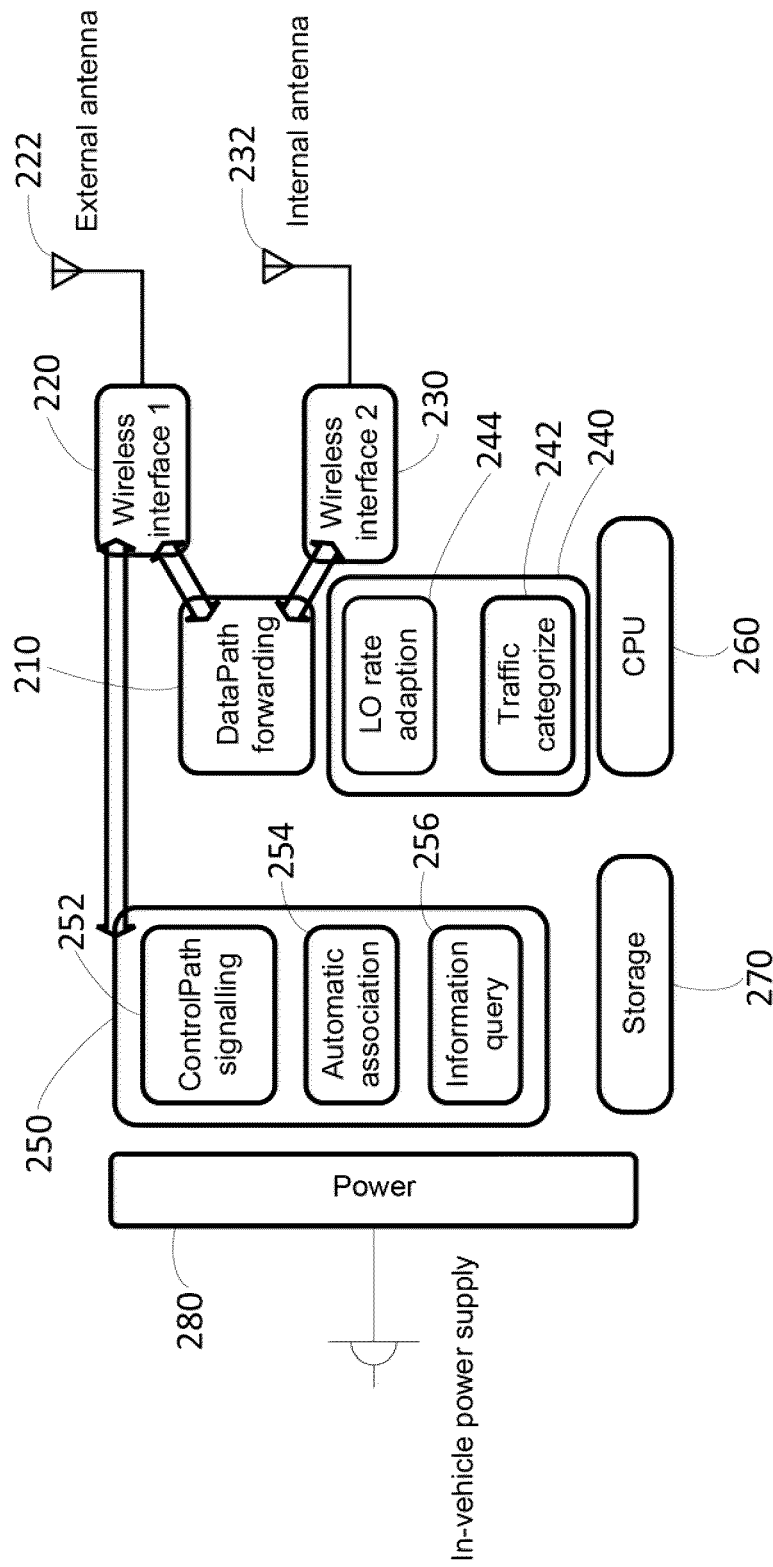
FIG. 2 is a block diagram of an in-vehicle smart device that may be used in the networked system illustrated in FIG. 1.

An in-vehicle device may be an in-vehicle device with software applications that require Internet access, or may be an in-vehicle smart device that forwards network traffic between other in-vehicle devices and the roadside access devices. Referring to FIG. 2, individual components of in-vehicle smart device 20 of an embodiment are shown in a block diagram. The IVSD shown in FIG. 2 has a datapath forwarder 210, two wireless interfaces 220,230, a network traffic manager 240, a connection manager 250, a microprocessor 260, a data storage 270 and power supply 280.

The IVSD has a first wireless interface 220 that is connected to an external antenna 222 and is used to communicate with the RSH. The IVSD has another network interface which is an interior network interface, such as a second wireless interface 230 that is connected to an internal antenna 232 and is used to communicate with devices of in-vehicle users, such as computers, smart telephone handsets, smart watches, among others. The first wireless interface and the interior network interface are connected to a datapath forwarding unit 210, in order to bridge the network data between in-vehicle users' devices and a connected roadside hotspot device, i.e., to forward network data from an in-vehicle user's device to the connected RSH and to forward the return network data from the connected RSH to the in-vehicle user's device.

The IVSD has a network traffic manager 240, which includes a traffic categorization unit 242 and a link rate adaption unit 244. The traffic categorization unit 242 provides a user interface to enable an in-vehicle user to categorize network data traffic of a user device into delay sensitive traffic and delay tolerant traffic. The traffic categorization unit 242 also can categorize data traffic into delay sensitive traffic and delay tolerant traffic or delay tolerant traffic based on traffic type (e.g., voice data, video data, e-mail message, web page) from a tag in the data frame made by the source application. The traffic categorization unit 242 then create a wireless data frame from the payload, sets the value of user priority in the user priority section according to the data type, and transmits the prioritized payload to RSH 40, via the first wireless interface 220 and the external antenna 222 connected thereto. Of course, the IVSD, or its traffic categorization unit 242, can also simply add a traffic type tag (e.g., voice, e-mail message etc.) in the payload and RSH can subsequently convert it to a priority value describing the priority of the data frame. The link rate adaption unit 244 automatically adjusts link rate between the IVSD 20 and a road-side hotspot 40 as the vehicle 10 driving in the coverage area 50 of RSH, in accordance with available bandwidth between the IVSD and the RSH and other network conditions, to minimize unnecessary rate adaption overhead.

The IVSD illustrated in the example shown in FIG. 2 also includes a network connection manager 250, which may include a control path signaling unit 252, an automatic association unit 254 and an information query unit 256. The control path signaling unit 252 is primarily for managing wireless connection between the IVSD and RSH and for managing user accounts of network users. The automatic association unit 254 manages the automatic association between the IVSD and an RSH, user authentication, and network parameters management (e.g., IP address settings), among others. The information query unit 256 supports exchange of information between the IVSD and RSH to exchange network connection information between them.

The operations of datapath forwarder 210, network traffic manager 240, network connection manager 250 and the wireless interfaces 220,230 are controlled by a programmed CPU (central processing unit). Programs containing computer instructions for programming the CPU 260 may be stored in a data storage unit 270, such as persistent memory storage, examples of which may include magnetic storage unit or semiconductor storage unit, among others. The execution of these instructions on the CPU 260 will direct the operations of the network traffic manager, datapath forwarder, network connection manager and the wireless interfaces. A power supply 280, such as a battery, or a power supply connection to an in-vehicle power supply, provides electric power to the CPU and these other units.

Of course, as will be appreciated, although the example described in detail is an IVSD that has two wireless interfaces, there may be a wired network interface (not shown) that either replaces the second wireless interface 230 or as an additional network interface for wired connection by other user devices inside the vehicle. As a further alternative, the in-vehicle device may be a user device that requires Internet connection, or more specifically, an internal component of the user device may require Internet connection. For example, it may be a smart telephone unit having Wi-Fi capability that requires roaming connection to roadside hotspot. The second wireless interface 230 then may be unnecessary and eliminated. The datapath forwarder 210 or the external antenna 222 may be directly connected to the internal component of the user device.

Figure 3:
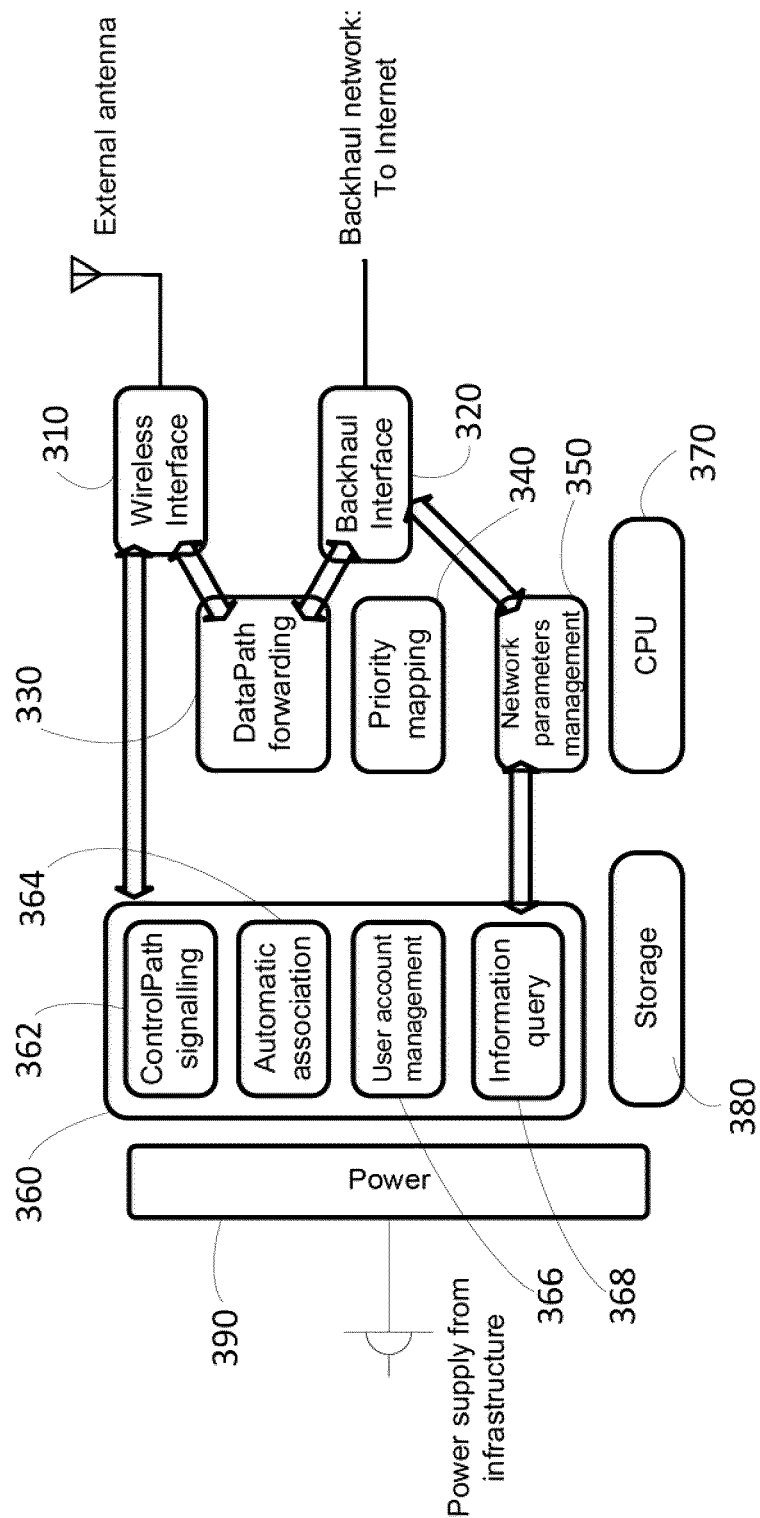
FIG. 3 is a block diagram of a roadside hotspot device that may be used in the networked system illustrated in FIG. 1.

Referring to FIG. 3, individual components of road-side hotspot 40 of an embodiment are shown in a block diagram. The RSH shown in FIG. 3 has two network interfaces 310,320, a datapath forwarder 330, a RSH priority mapping unit 340, a network parameters manager 350, a counterpart connection manager or RSH connection manager 360, a microprocessor 370, a data storage 380 and power supply 390.

The RSH shown in FIG. 3 has one wireless interface 310 and one backhaul network interface 320, which may be wired or wireless (e.g., wirelessly connected to a wired interface with direct connection to backhaul network). The RSH datapath forwarder 330 is connected between the wireless interface 310 interfaced with an antenna and the backhaul network interface 320 interfaced with a network connection, and forwards data traffic between the wireless interface and the backhaul network interface, i.e., data traffic bridged by the wireless connection IVSD-RSH and data traffic bridged by the network connection RSH-backhaul network.

The RSH priority mapping unit 340 manages priority parameters on both wireless side and backhaul network side, and maps them from user specified priority values to network transmission priority values on backhaul network side, and from network transmission priority values to priority values for user devices. A pre-defined mapping scheme, for example, stored on the data storage unit, may be specified and used in the mapping. In general, in such a mapping, more delay tolerant is mapped to lower priority, though the actual priority values in a mapping may depend on each implementation. For example, the RSH priority mapping unit 340 may read the user priority section of a wireless frame from IVSD, or read the priority traffic type tag added by IVSD in the payload, and map it to a network transmission priority value. For example, the value in the user priority section may be 7 (out of a range of 0 to 7), or the traffic type tag may be delay sensitive. This indicates to the RSH that the payload should be transmitted immediately, or as soon as possible. The RSH priority mapping unit 340 then maps the user priority value or the traffic type tag value to a high network transmission priority value for backhaul transmission, e.g., 46 for Ethernet™ devices. The value in the user priority section also may be 0 (out of a range of 0 to 7), or the traffic type tag may be delay tolerant. This indicates to the RSH that the payload may be transmitted after transmission of all other high priority data traffic. The RSH priority mapping unit 340 then maps the user priority value or the traffic type tag value to a low network transmission priority value for backhaul network transmission, e.g., 0 for Ethernet devices. On the other hand, for data traffic returning to the IVSD, the RSH priority mapping unit 340 may map a high network transmission priority value (e.g., 46 for ethernet) of a backhaul network frame to a user priority value of 7 and a low network transmission priority value (e.g., 0 for Ethernet) of a backhaul network frame to a low user priority value of 0 when transmitting to IVSD.

The network parameters manager 350 obtains information from backhaul network for setting proper network parameters for IVSD and RSH. Parameters set for IVSD are further used by the automatic association unit and the information query unit of the RSH connection manager 360, as will be further described.

The RSH connection manager 360 may include its control path signaling unit (RSH control path signaling unit 362), its own automatic association unit (RSH automatic association unit 364) and its own information query unit (RSH information query unit 368), as illustrated in the example shown in FIG. 3. The RSH control path signaling unit 362 cooperates with ISDV signaling control unit 252 to manage the wireless connection between the IVSD and RSH and to manage network users. The RSH automatic association unit 364 cooperates with the IVSD automatic association unit 254 to manage the automatic association between the IVSD and the RSH, the network connection setup between the IVSD and RSH, including association, authentication etc. (either locally or remote authentication). The RSH information query unit 368 cooperates with IVSD information query unit 256 to support or provide an interaction mechanism between the IVSD and RSH to exchange network connection information between them. The RSH user account manager 366 keeps user account information of recently authenticated user accounts, namely, stores copies of such user account information or data corresponding to such user account information (e.g., encrypted or hashed data) in local storage unit 380. Such information or data may have a limited storage period (e.g., 30 days), and may be removed periodically if stored longer than the storage period. The RSH user account manager may perform local authentication using locally cached such user account information or data for the next visit of the hotspot coverage area by the user.

As will be understood by those skilled in the art, the operations of RSH units are controlled by a programmed CPU, or RSH CPU 370. Programs containing computer instructions for programming the RSH CPU 370 may be stored in the RSH data storage 380. The execution of these stored instructions on the RSH CPU will direct the operations of RSH units. A power supply 390, such as a battery, or a power supply connection to infrastructure facilities, provides electric power to the RSH CPU and these other RSH units.

Management server 60 ("MS") manages user accounts, and records each user's network activities such as network usage, online duration, etc. The MS 60 also can remotely upgrade firmware or software functions to a better version to improve network performance.

Figure 4:
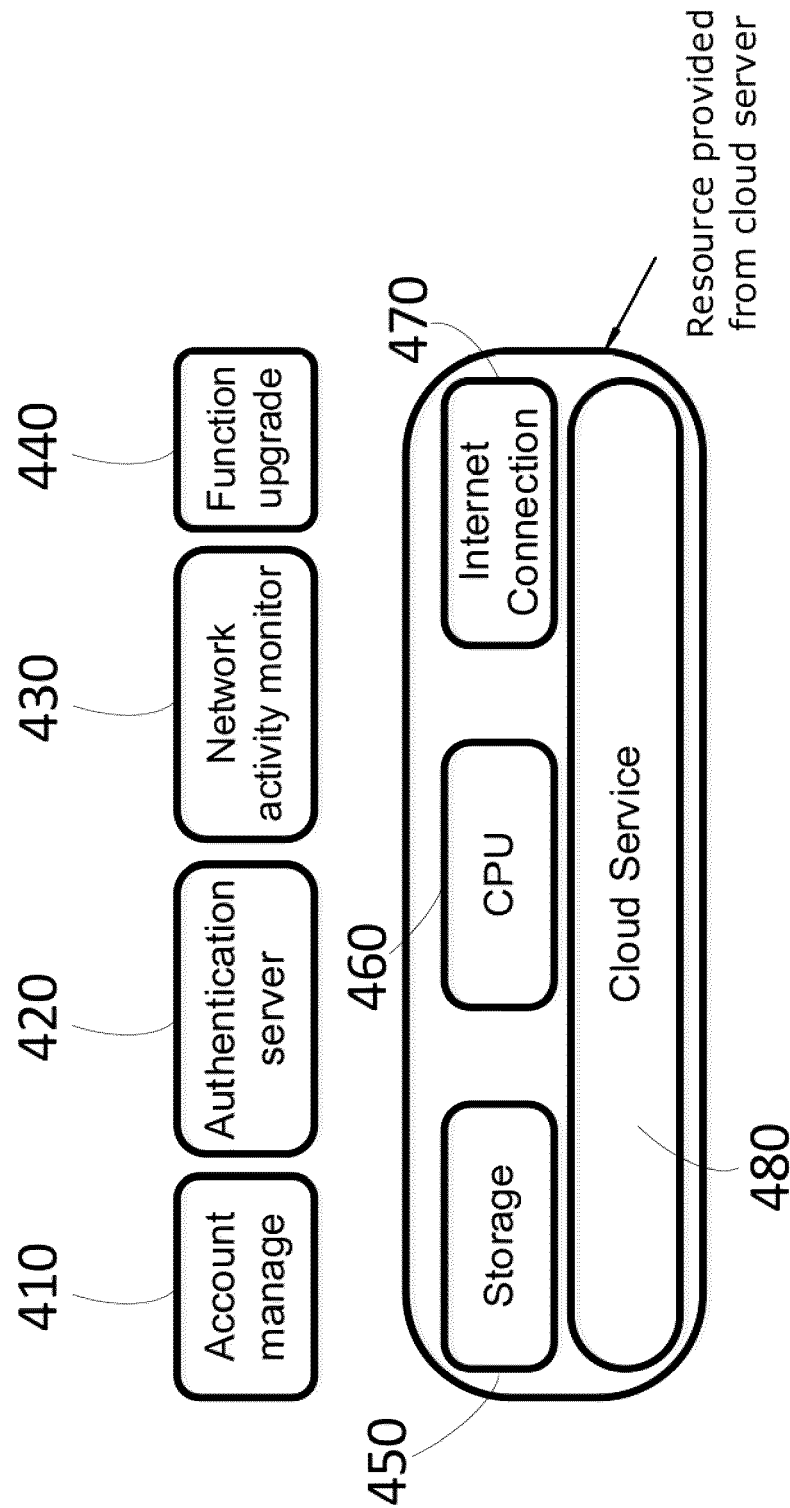
FIG. 4 is a block diagram of a cloud management server that may be used in the networked system illustrated in FIG. 1.

Referring to FIG. 4, individual components of management server 60 of an embodiment are shown in a block diagram. The MS shown in FIG. 4 has an account manager 410, authentication server 420, network activity monitor 430, and client function update unit 440, each of which will be briefly described below. Operations of these units are controlled by programmed computer instructions, which may be stored on MS data storage 450, executing on MS CPU 460 of a cloud server or cloud service 480 which includes an internet connection 470.

Account manager 410 stores and keeps track of user account information, such as user account credentials and user network usage data. An administer user can remotely add, modify or delete user accounts, among others, using the account manager. Authentication server 420 cooperates with RSH user account manager 366 to authenticate a user, thus granting or denying access to the backhaul networks requested by a user according to the user's account information or lack thereof. Network activity monitor 430 logs and reports network activities of managed users. Recorded network activities may include time and date of user logins, logoffs, a user's online duration, data usage, average link rate of a connected session between the IVSD and the RSH, among others.

Client function update unit 440 sends new or modified versions of computer application software, firmware or modules to connected IVSD and RSH to upgrade and/or modify their respective capabilities or features. Update or upgrade may be initiated by a trigger. Once triggered, the RSH will upgrade itself to the new version accordingly and will send the new version of IVSD software to IVSD. User may specify a particular version to upgrade or also may request that the software applications or functions are automatically upgraded according to predefined policy. Alternatively, MS 60 (i.e., client function update unit 440) may send a trigger signal to RSH 40, which will download the new version of software of both RSH and IVSD and store the downloaded version in local storage. This download generally is delay tolerant, i.e., may be performed when the backhaul network is not congested (i.e., under low load). Thus, traffic priority of updates may be set to low and transmission will not start until there is no user data transmission between IVSD and RSH. Conveniently, the IVSD software can be downloaded from different RSH for different parts. The IVSD software also can be obtained in any other suitable manner, such as downloaded from home Wi-Fi, or LTE networks or other network access points, or loaded directly from USB connections.

In operation, an in-vehicle device such as an in-vehicle smart device (IVSD) is placed inside a vehicle and powered by in-vehicle power supply. When the vehicle 10 approaches and enters the coverage area 50 of a roadside hotspot, there will be message exchange between the IVSD 20, the RSH 40 and the management server 60 (MS). An automotive access procedure will be initiated and completed to establish connection between the IVSD 20 and the RSH 40, and through which, connection from the IVSD 20 to the backhaul network 30. The connection process is automated. This automated access process is described in detail below in reference to FIG. 5. Broadly speaking, the process may be divided into the following 7 stages:

1. Broadcasting tagged information (step 510)
2. Making IVSD-RSH association (step 520)
3. User authentication locally at RSH, if account information cached locally (step 530)
4. Relay authentication messages between RSH and MS if account information not available locally (step 540)
5. Setting IVSD's network parameters (step 550)
6. Storing locally account information of authenticated users (step 560)
7. Monitoring and logging user network activities (step 570)

These stages are now described in further detail in reference to FIG. 5 to FIG. 8.

Figure 5:
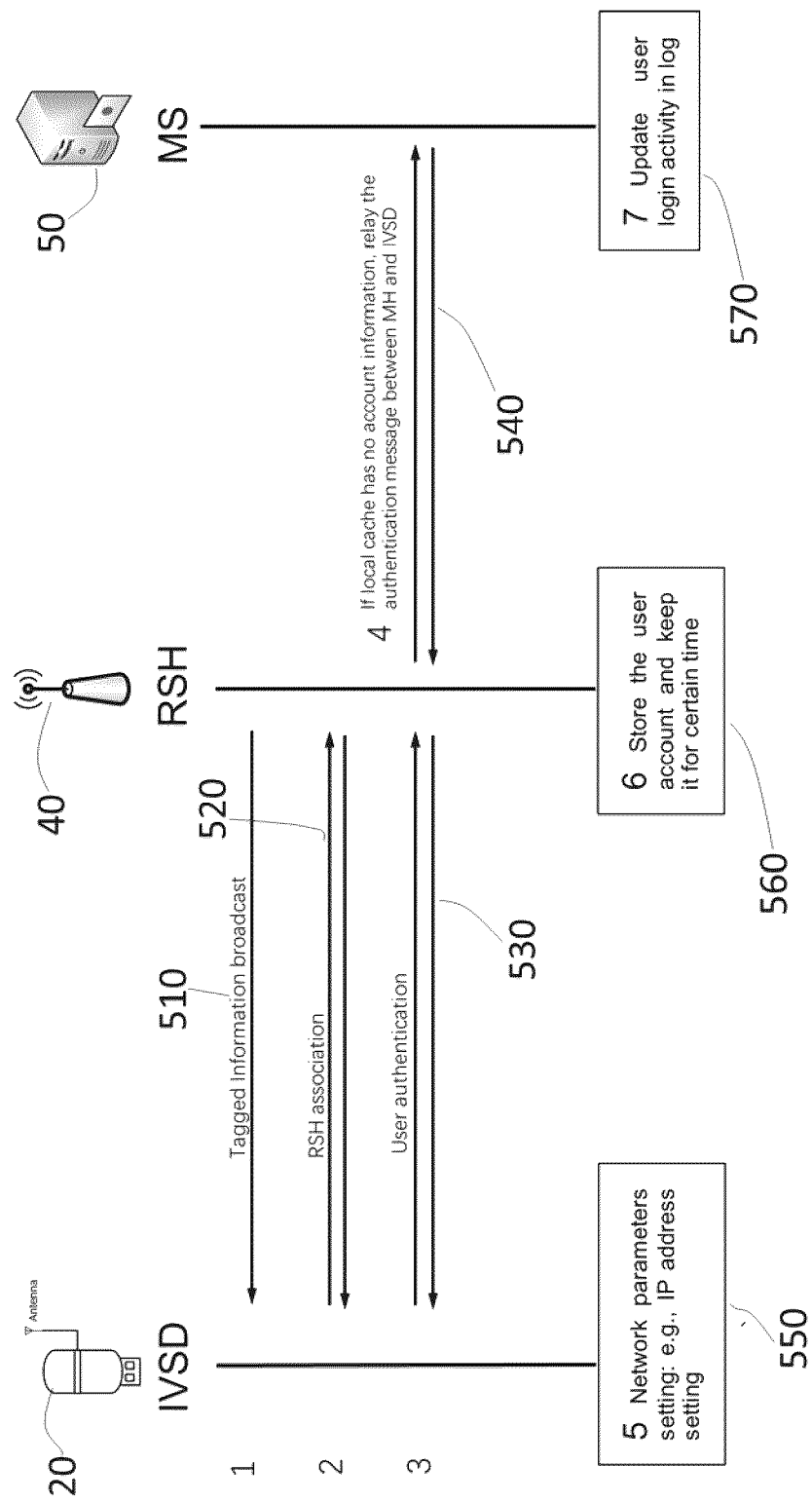
FIG. 5 shows steps of a process for connecting an in-vehicle device to a roadside hotspot device, and through which to connect to backhaul network, in the networked system illustrated in FIG. 1.
Figure 6:
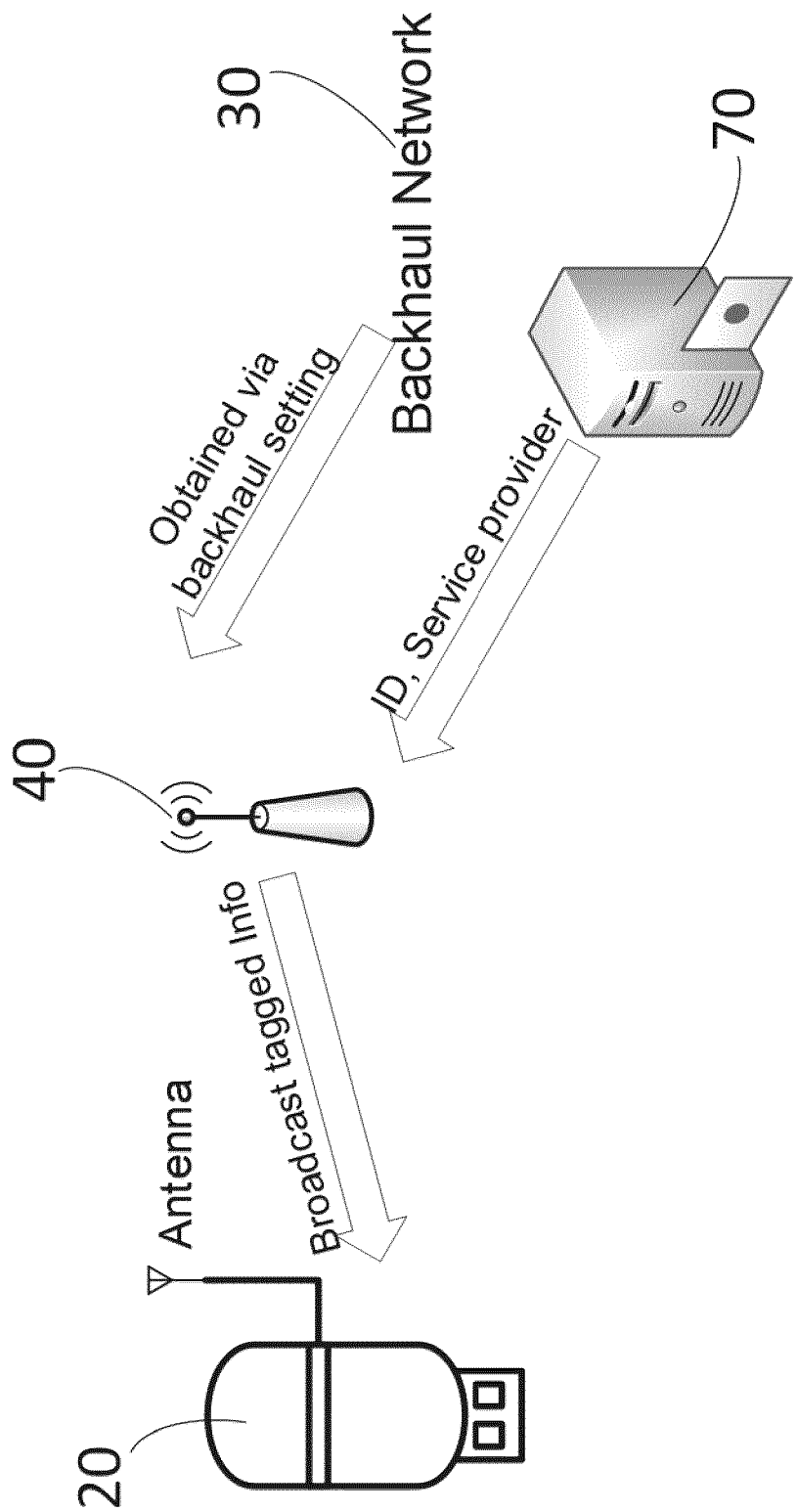
FIG. 6 is a schematic diagram that illustrates exchange of information between various devices in the networked system illustrated in FIG. 1.

Referring to FIG. 5 and FIG. 6, during the first stage, i.e., prior to any communication or connection to the IVSD 20, the RSH 40 periodically broadcasts, or sends, beacon frame messages, which include tagged information (step 510), to advise its availability to connect. In one embodiment, the tagged information includes the following information, a) an identification section (or ID) to advertise that the RSH can provide wireless access to the network, which may also indicate the backhaul service provider name;

b) a function indicator embedded in system information to advertise support of functions provided by the IVSD and RSH;

c) a list of network parameters such as IP address/mask, or VLAN setting specified by backhaul service provider, that may be used by an IVSD to set its network connection parameters; and d) bandwidth of the backhaul network.

In general, the ID should require as less space as possible but still contain all necessary information. For example the ID can be a combination of a specific tag plus service provider's name: AutoAccess_ISPName_DeviceID, which advertises to the IVSD to show the above information for the very initial step to associate. The tagged information may also include other network parameters, such as PHY mode, rate list, or any other network parameters generally required for setting up wireless connection between the RSH and an IVSD.

The tagged information can be sent in one beacon frame or several beacon frames. The broadcast interval of all tagged information is set to a value such that the tagged information can be sent out at least once during stage 1 to stage 3.

Figure 7:
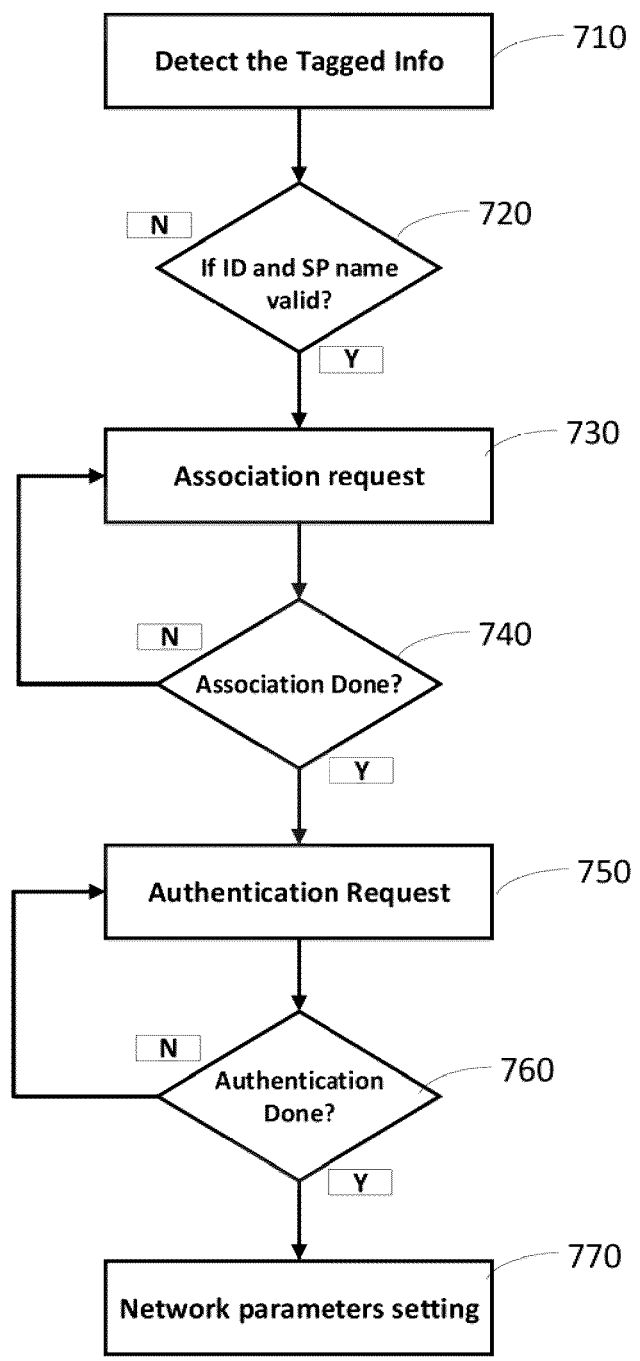
FIG. 7 is a flowchart that illustrates steps of connecting an in-vehicle device to a roadside hotspot device, and through which to connect to backhaul network, in the networked system illustrated in FIG. 1.

On the IVSD's side, when the IVSD 20 approaches the coverage area 50 as the vehicle drives in, the IVSD receives the tagged information included in the beacon frame messages broadcasted by the RSH, and then checks if the ID of the RSH 40, e.g., AutoAccess_ISPName_DeviceID, and the name of the Internet service provider 70 (SP) are valid, i.e., the user account stored is allowed to access the SP identified by the "ISPName" portion. It may also check the ID, in particular, its special tag AutoAccess, to determine if the RSH detected can support the wireless connection function described herein, i.e., to infer its ability to support the functions based on the portion of "AutoAccess" in the ID name. If any one of the ID, SP name or the function indicator is not valid, the IVSD may stop further connection process steps now. This is illustrated in FIG. 7, a flow chart of the IVSD behavior in automatic access procedure.

First, the IVSD receives the beacon frame messages which include the tagged information broadcasted by the RSH and detects the tagged information (step 710). The network connection parameters, ID and other information included in the tagged information are also extracted. Next, at step 720, the RSH's device ID and service provider (SP) name are checked. A known device ID and a known service provider name generally indicate to the IVSD that the hotspot is available for access. If the user account in IVSD is allowed to access the SP and the ID indicates that the wireless connection function described herein is supported, i.e., if the checking of the ID, SP name and the function indicator returns a valid result, the IVSD makes the IVSD-RSH association (step 520 in FIG. 5). The association is performed as follows as illustrated in FIG. 7. First, at step 730, the IVSD cooperate with the RSH to associate with each other. This can be initiated, e.g., by the IVSD or its automatic association unit 254 sending an association request to the RSH to set up a temporary connection for further authentication. The RSH, or its automatic association unit 364, will check the IVSD device ID contained in the association request frame, and if it is valid, then replies by sending an acknowledgement ACK as a handshake to set up the temporary connection. If this acknowledgement is received at the IVSD, the IVSD is successfully associated with the RSH (step 740). The RSH may also include its ACK message a unique index for the IVSD to select from among the network connection parameters included in the tagged information a unique subset of network connection parameters to use later during network set up to establish the wireless connection, as will be further described. The IVSD will continue sending the association request until successfully associated with the RSH.

Once associated, the IVSD will request to be authenticated. Generally, it is the IVSD that initiates an authentication process. At step 750, the IVSD initiates an authentication process by sending an authentication request to the RSH. This request may be sent by the automatic association unit 254 of the IVSD. The IVSD may be authenticated by either the RSH locally (step 530 in FIG. 5) or by the MS remotely (step 540 in FIG. 5). Either way, the IVSD is notified by the RSH if the authentication succeeded, for example, by an ACK message from the RSH, to confirm the success of authentication. If the authentication is successful and confirmed (step 760), the IVSD will proceed to set its network connection parameters (step 770, step 550) in order to connect the IVSD 20 to the RSH 40, and through which to the backhaul network 30. Establishing the wireless connection between the IVSD and the RSH, i.e., further message exchanges and other cooperation between the IVSD and the RSH, may follow standard protocols, such as those specified in the IEEE 802.11 standards.

The network connection parameters set by the IVSD at step 770 are included in the tagged information contained in the beacon frame messages that are broadcasted by RSH 40 and received by IVSD at step 710. As the IVSD already has the network connection parameters at this moment, there is no need for the IVSD to obtain these network connection parameters after authentication step 760, thus reducing the time required for establishing the wireless connection with the IVSD and the RSH.

During or after setting up wireless connection, the IVSD may request additional network parameters (e.g., network parameters for establishing a virtual private network) by sending a request to RSH, in response to which, the RSH sends the requested information in a broadcast to the IVSD.

In general, the tagged information includes not merely one network address, but may include several and often a range of network addresses. A suitable collision avoidance scheme may be adopted to prevent the happening of use of the same network parameters by several approaching vehicles (i.e., multiple IVSDs) entering the coverage area at about the same time. For example, the RSH may include an index uniquely associated with the IVSD in its association ACK to the ISVD. Thus, each IVSD will select from the same range of network addresses a different network parameter set uniquely identified by the unique index, thus avoiding any potential conflict of using the same parameters (e.g., using the same Internet IP address).

Figure 8:
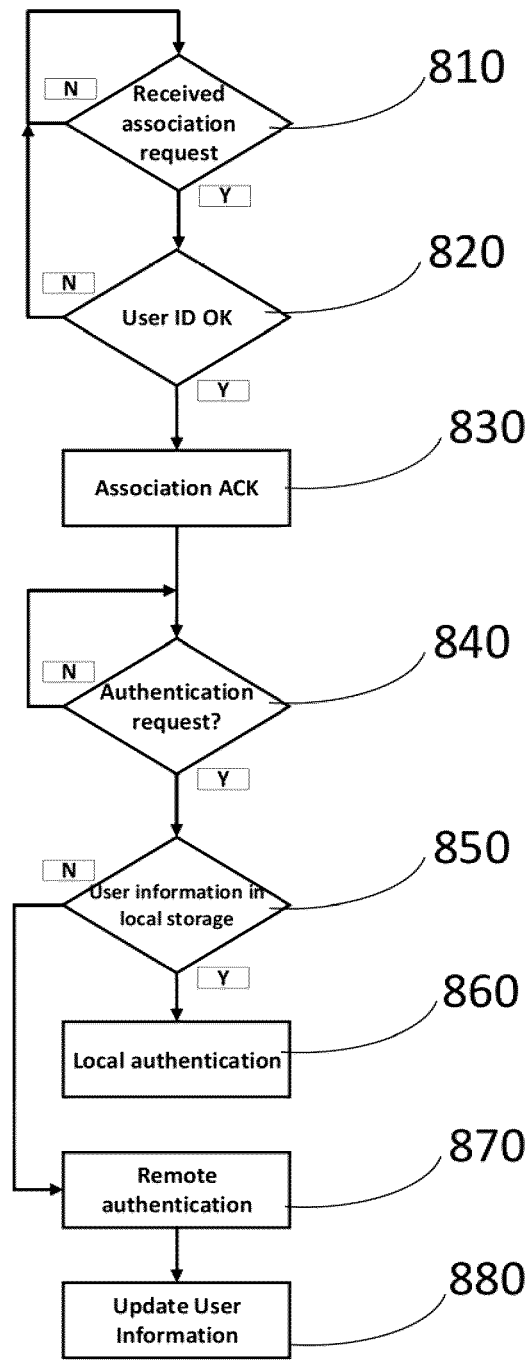
FIG. 8 is a flowchart that illustrates steps of connecting a roadside hotspot device to an in-vehicle device, to provide wireless network access in the networked system illustrated in FIG. 1.

FIG. 8 is a flowchart describing the RSH behavior in the automatic access procedure after receiving an association request. The RSH always broadcasts tagged information (step 510). IVSD uses the tagged information to recognize the network and to send association request to the RSH to establish wireless connection. When the RSH receives an association request at step 810, it will check if the IVSD has a device or user ID which is known to RSH (e.g., the device ID is in the allowable device list) (step 820). If the ID is not valid, the RSH may stop further steps of the process to make association with the requesting IVSD. If the device or user ID is known to RSH, e.g., the device ID is in the list of allowable devices, the RSH will reply with an association acknowledgment, or sending an ACK message (step 830). This will complete the association between the IVSD and the RSH. Once associated, the IVSD will request its authentication and the RSH will wait for this authentication request (step 840). Once the authentication request from the IVSD is received at step 840, the RSH will check if the user account information is kept locally (step 850), e.g., at its user account manager. If so, the RSH 40 will locally authenticate the user at step 860. Otherwise, the authentication server of the MS 60 will remotely authenticate the user (step 870).

As described already, the RSH caches user account information for a selected storage period. The RSH therefore first checks if the user's user account information or data is stored locally and, if so, do local authentication. The user account information may be user access credentials, such as user's username and access password, or an encrypted or hashed version thereof, among others. If the user account information or data is not stored in data storage of RSH, then RSH 40 communicates and cooperates with the MS 60 to authenticate the user at step 540,870. To authenticate a user remotely, RSH 40 relays the authentication messages between the IVSD 20 and MS 60 but does not process the messages locally (i.e., does not perform local authentication at the RSH). It is also possible that the user has updated its account information since last connection (i.e., last successful authentication). This will lead to failure of local authentication. If local authentication fails, remote authentication (step 870) also will be performed.

If a user is remotely authenticated and is authenticated successfully, the user account information is stored (or updated) in the RSH locally for the selected storage period, i.e., a pre-selected time period such as one month (step 560, step 880), or until storage overflow. During a connected session, the MS 60 will record the user login activity, network usage data, and network access information such as time and location of making access (step 570), based on which calculate any network usage or access fee.

Figure 9:
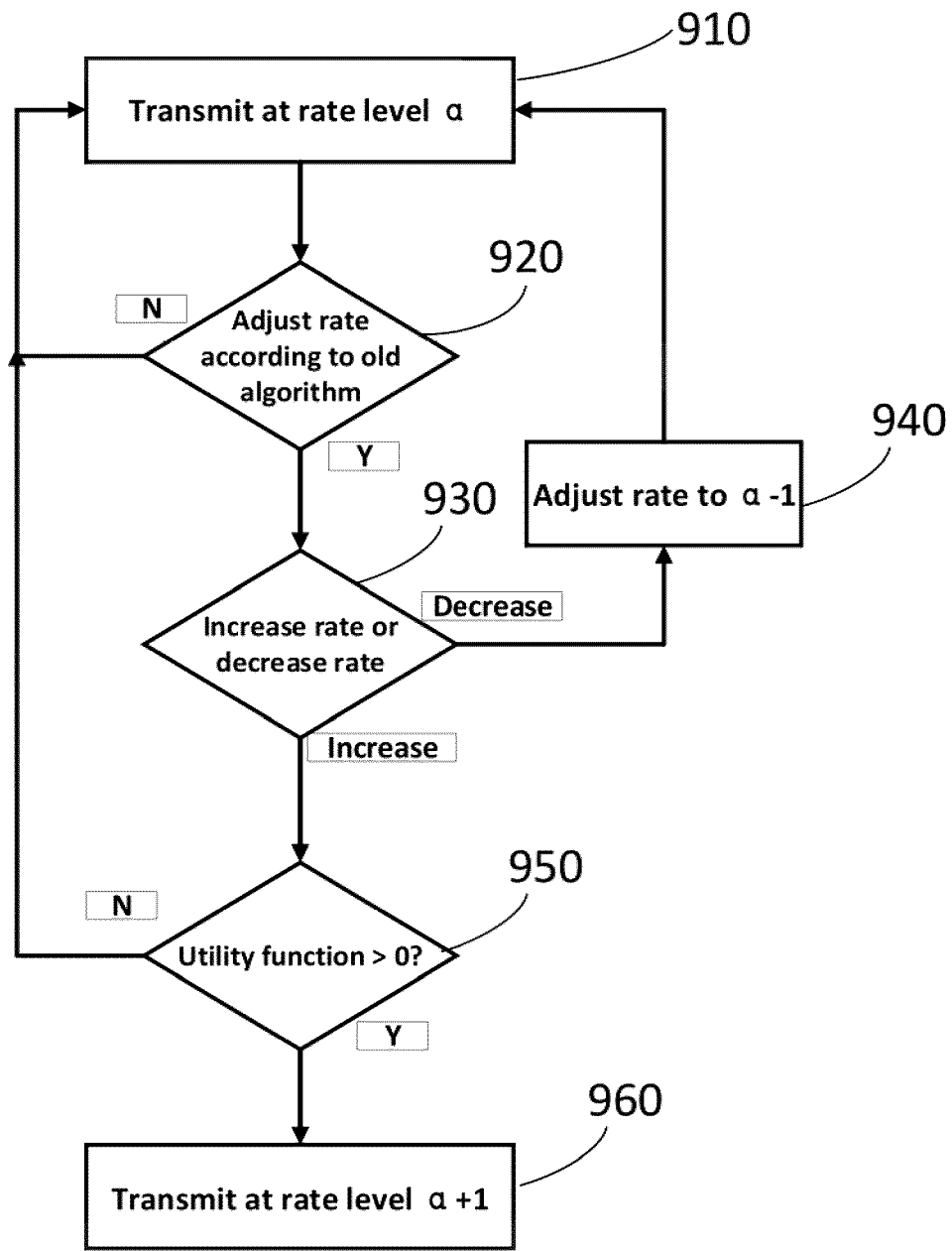
FIG. 9 is a flowchart that illustrates steps of a method of adapting network link rate between a roadside hotspot device and an in-vehicle device illustrated in FIG. 1.

To further improve connection performance, it is desirable to reduce unnecessary connection overhead during the connection process or connected session. A link rate adaption unit 244 is provided for this purpose, which utilizes backhaul network information and other information about network condition to reduce overhead. Attempts requiring link rate over the available bandwidth and beyond transmission capacity limited by other network conditions will be curtailed. The backhaul network information may include: current available bandwidth, current number of associated users, RSH transmission cache status (high occupancy or low occupancy). Its operation is now further explained in reference to FIG. 9, a flow chart of a link rate adaption method.

At any given time when there is data transmission between IVSD and RSH, the connection is established at a particular link rate a (step 910). The IVSD will periodically collect connection data and monitor connection statistics, such as packet drop rate. This provides an indication whether the link rate a may be increased to achieve better throughput or whether the link rate should be decreased to maintain better network connection. This indicator may be computed from an algorithm such as frame loss based rate adaption algorithm, which calculates the frame loss statistics during certain monitored time duration (step 920). Examples of such algorithms include auto rate fallback (ARF) algorithm and adaptive ARF (AARF) algorithm. This indicator is evaluated to determine whether the link rate is to be increased or decreased (step 930). If the indicator suggests the link rate to be reduced, the IVSD will reduce the link rate (step 940) when sending a frame to RSH. If a calculation suggests increase of link rate, a further calculation of a utility function is performed (step 950) to determine if the network condition, for example, the available backhaul network bandwidth, will allow the transmission rate to be increased above certain level. The link rate is set to next higher level, i.e., increased, only if the calculated result indicates extra transmission capacity of the network being available for the rate increase; otherwise, the link rate stays at current rate level a.

A utility function is designed to be a consolidated indicator incorporating a number of selected inputs that are relevant to capacity of network transmission, such as bandwidth of backhaul network and load of the connected RSH device. The use of the utility function helps to reduce the inefficient upward link rate adjusting attempts when network bandwidth or load would not support such attempted rate increase to an increased link rate, especially when the vehicle drives through the coverage area of RSH. The utility function can be a probability-driven function, to select an output U value, or can be a weighted sum of inputs, i.e., summation of coefficient-items. In a summation of coefficient-items, each of the input variables is assigned a weighting factor to show the contribution to U respectively. Using the utility function, if U=+1, then the requested (or attempted) link rate increase is allowed; and if U=−1, then the rate increase is not allowed.

In one embodiment, the utility function may have the form, $$U=f(\text{overall bandwidth, current available bandwidth, current associated users, cache status})$$

where 1) overall bandwidth: the transmission bandwidth that the backhaul network can provide; the larger the overall bandwidth is, the higher the possibility of U having the value of +1;

2) current available bandwidth: the remaining available transmission bandwidth of the backhaul network; the larger the current available bandwidth is, the higher the possibility of U having the value of +1;

3) current associated users: the number of the users that are already associated to RSH, which is an indication of the load of the RSH; the more the current associated users, the higher the possibility of U having the value of −1;

4) cache status: the status of the transmission queue in the datapath of RSH: if the cache is highly occupied, it indicates that the remaining cache storage is limited, and vice versa; if the cache is highly occupied, the probability of U=−1 is higher.

Figure 10:
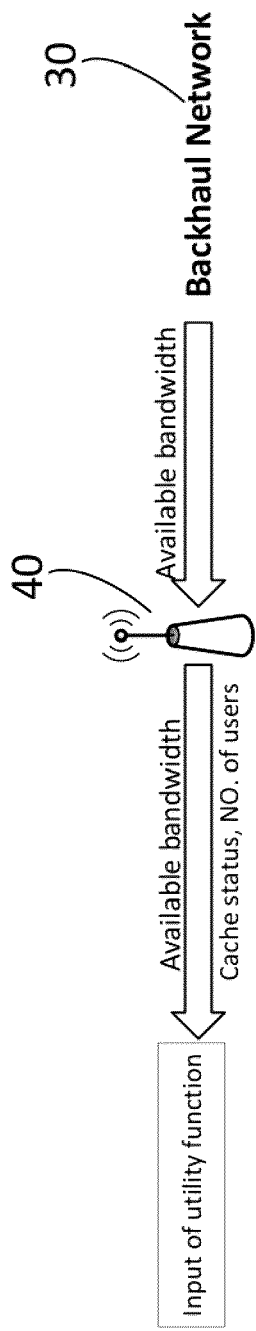
FIG. 10 is a schematic diagram that illustrates transmission of information to roadside hotspot device and in-vehicle device that is used in the method illustrated in FIG. 9.

The inputs of utility function are sent to each of the IVSDs by broadcast from the RSH, either periodically or upon request by one of the IVSDs. On the other hand, each time the RSH device receives the input information from the backhaul network, e.g., the Internet service provider or other nodes on the backhaul network, the RSH stores the information locally for later broadcasting to the IVSDs in its coverage area. This is further illustrated in FIG. 10.

Figure 11:
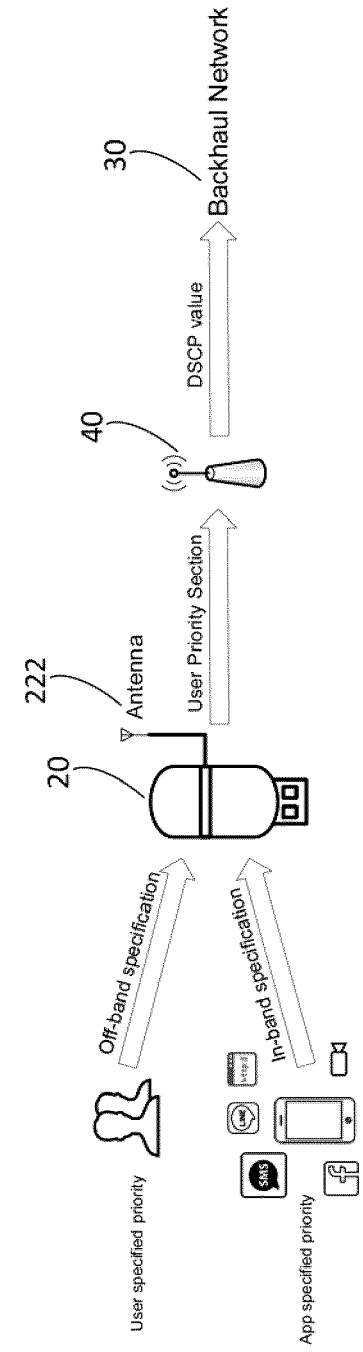
FIG. 11 is a schematic diagram that illustrates tagging and mapping of priority information assigned to data traffic transmitted by roadside hotspot device and in-vehicle device.
Figure 12:
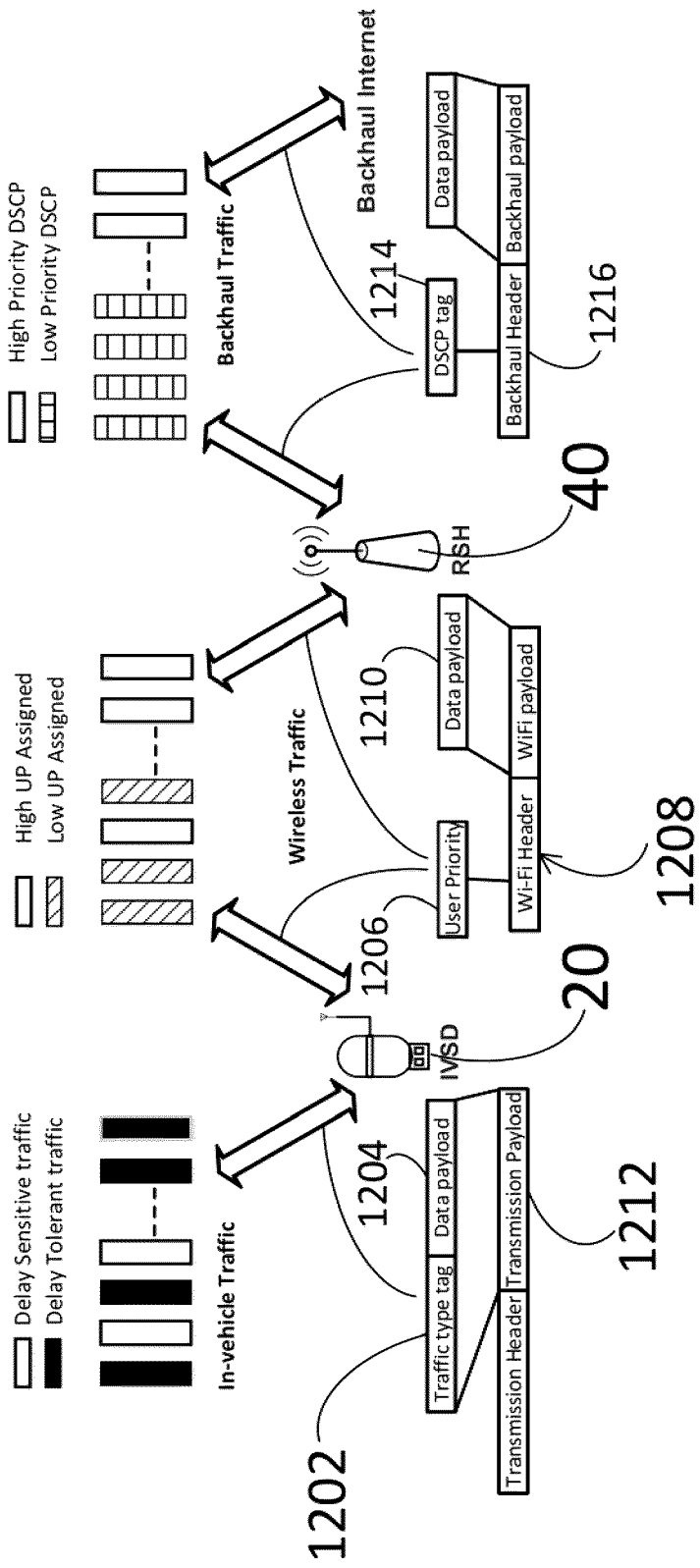
FIG. 12 is a schematic diagram that illustrates mapping of priority information assigned to data traffic transmitted by roadside hotspot device and in-vehicle device.

Reference is now made to FIG. 11 and FIG. 12, which illustrate the mapping between user specified priority and network transmission priority value. The user data can be marked as low priority traffic or high priority traffic as shown in FIG. 11 and FIG. 12, i.e., delay tolerant or delay sensitive. The traffic categorization unit 242 of the in-vehicle device enables a user to make the categorization and marking. Conveniently, one may assign a priority parameter for all traffic from a given user or user device. A user or user device ID, such as the MAC address of the user device, may be used to identify a user or user device. Alternatively, a user application may tag its data traffic as high or low priority. The tag 1202 may be added in the payload 1204 of the in-vehicle traffic by the application, as shown in FIG. 12. The traffic categorization unit 242 recognizes this tag and maps it accordingly, i.e., based on a pre-designated mapping scheme, or may simply forward to the RSH to map. For example, data traffic tagged as delay sensitive may be mapped to high user priority (a value of 7) in a user priority section 1206 of wireless frame 1208 and data traffic tagged as delay tolerant may be mapped to low user priority (a value of 0). Prioritized payload, i.e., data payload 1210 tagged with priority mapped from user priority 1206, is transmitted to RSH, over the wireless link between the in-vehicle device and the RSH. Alternatively, the traffic categorization unit 242 or in-vehicle device may put a priority tag 1202 in the transmission payload 1212 to indicate the traffic type of the frame (delay tolerant or delay sensitive) and sends the transmission payload to the RSH, without mapping the user priority locally at the IVSD. The priority mapping unit 340 of RSH reads the user priority section 1210 or the traffic type tag 1202 of received wireless frame, and maps it to backhaul transmission priority value 1214 accordingly. For example, the backhaul priority value 1214 may be set to a high value (i.e., mapped to a high value) if the user priority value 1206 is 7 or the traffic type tag 1202 is delay sensitive; and the backhaul transmission priority value 1214 may be set to a low value (i.e., mapped to a low value) if the user priority value 1206 is 0 or the traffic type tag 1202 is delay tolerant. The backhaul transmission priority 1214 usually is located in the header section 1216 in the data frame, as shown in FIG. 12.

Figure 13:
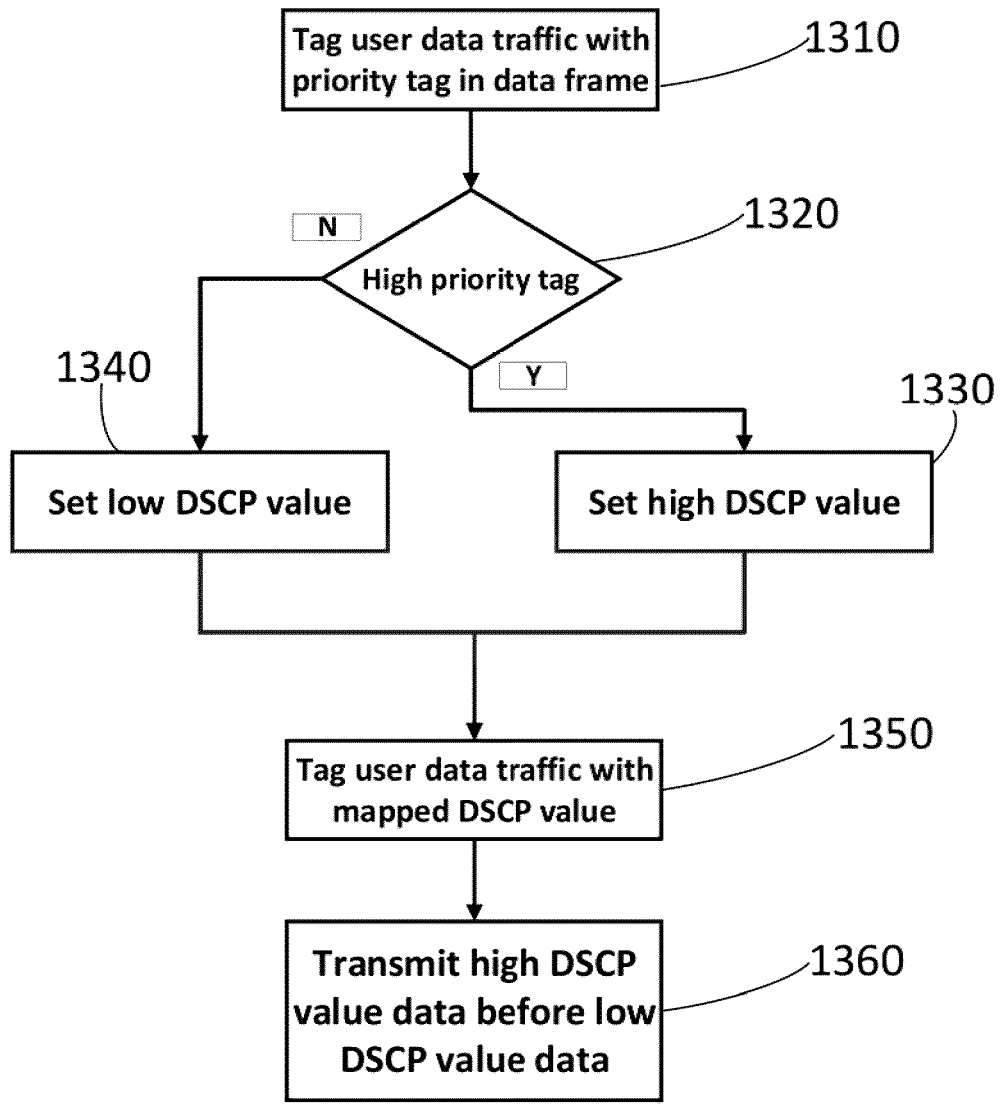
FIG. 13 is a flowchart that illustrates steps of a method of tagging and mapping priority information and transmitting data traffic from in-vehicle device to roadside hotspot device in a networked system illustrated in FIG. 1.
Figure 14:
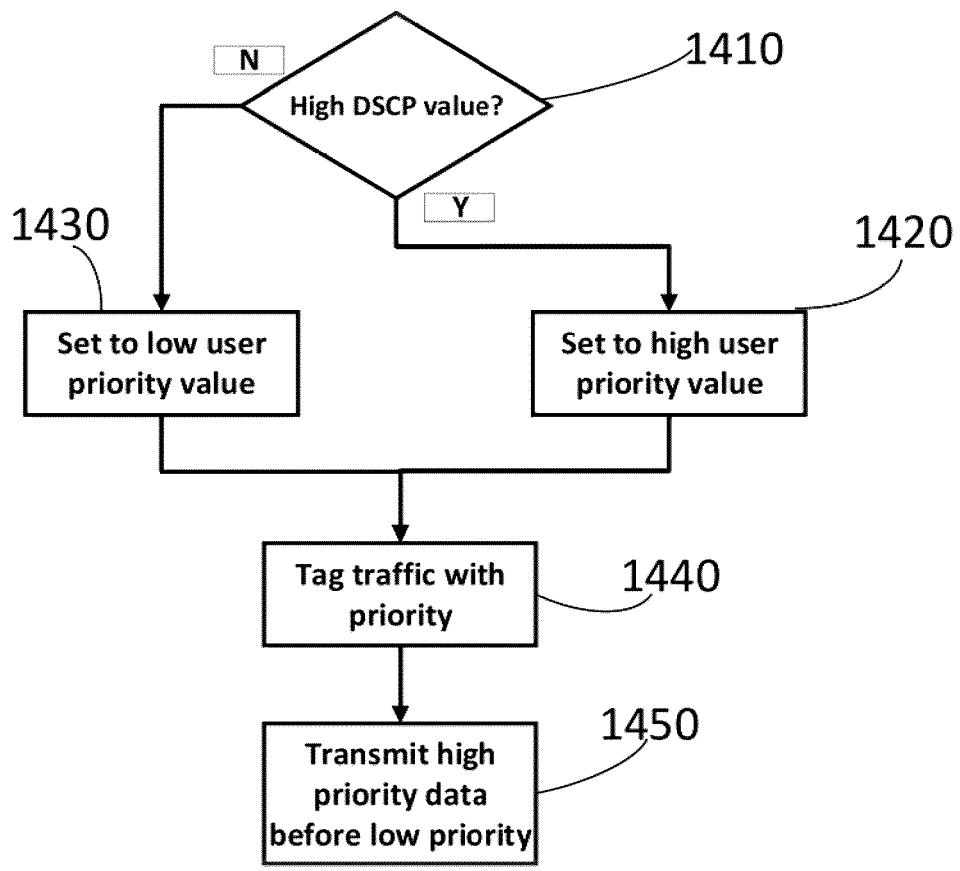
FIG. 14 is a flowchart that illustrates steps of a method of tagging and mapping priority information and transmitting data traffic from roadside hotspot device to in-vehicle device in a networked system illustrated in FIG. 1.

FIG. 13 is a flow chart illustrating marking of user priority of data traffic and mapping of the user specified priority to network priority.

First, at step 1310, user specified priority is set at IVSD. This may be set in any suitable manner. For example, the in-vehicle user may tag the data traffic from the user's device as high or low priority. Voice or video data may be tagged as delay sensitive or high priority, and sharing of data may be tagged as delay tolerant or low priority. For example, a user interface is provided at a smart phone, and user can use the user interface to tag all data traffic from that smart phone as high priority. Once tagged by a user, the IVSD then sets the User Priority Section (UPS) in those traffic frames respectively according to the user selection. As an example, the user priority ("UP") may have a numerical value from 1 to 7, with 7 being high priority traffic and 1 low priority traffic. Alternatively, a user application generating data traffic may add a specific section in the data traffic frame to indicate the frame is delay sensitive or delay tolerant, and the IVSD recognizes the section and sets the UPS accordingly. The priority may be set during the connection phase, or the priority may be set when there is a new wireless connection to the RSH or when a new user device is connected to the IVSD. The IVSD transmits the user data traffic to the RSH with the tagged priority.

Next, at step 1320, the RSH receives the tagged data traffic from the IVSD and checks first whether the data frame has been assigned a high UP value or a low UP value. The RSH tags a network priority value to the data traffic from the IVSD according to UP value tagged by the user or user application. For example, the RSH may recognize that the traffic has been tagged with a high UP value or read the traffic type tag in payload as delay sensitive, and will set accordingly the highest DSCP value, namely 7 (step 1330). If RSH recognizes the traffic has been tagged with low UP value and will set accordingly the lowest DSCP value, namely 1 (step 1340). The RSH will then tag the data traffic with the network priority value (step 1350), i.e., the DSCP value. Next, the RSH transmits to backhaul network the data traffic with the tagged DSCP value, but only first the high DSCP value traffic (step 1360). Any low priority traffic, if not sent, will be cached first before being sent, until there is no high priority traffic left. Cached low priority traffic may be dropped due to cache overflow.

This transmission according to priority may also be performed at the IVSD. For example, the IVSD will check if all data traffic tagged with high UP value have been sent and will keep sending out all data traffic tagged with high UP value before it will start sending out data traffic tagged with lower UP value, even if such lower UP value traffic may have been generated earlier.

In the return trip, i.e., in the traffic flow from the backhaul network 30 to the RSH 40, and from the RSH 40 to the IVSD 20, a reverse mapping is applied. In other words, the RSH priority mapping unit 340 first determines if the returning data is tagged with high DSCP value or low DSCP value (step 1410). If it is tagged with high DSCP value, the user priority value is set to a high value (step 1420). If it is tagged with low DSCP value, the user priority value is set to a low value (step 1430). The data is then tagged with the mapped user priority value (step 1440) and sent back to the IVSD.

During transmission of data back to the IVSD, data tagged with high user priority value is first transmitted to the IVSD and data tagged with low user priority value is transmitted to the IVSD only after all data traffic tagged with high UP value have been sent (step 1450).

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof

What is claimed is:

1. A method of connecting an in-vehicle device inside a vehicle to a telecommunication network through a roadside hotspot ("RSH") device connected to the telecommunication network, the method comprising the steps of:
   prior to receiving any request from the in-vehicle device, the roadside hotpot device broadcasting beacon frame messages including tagged information, the tagged information including wireless network connection parameters, information of current network condition and identifier of the roadside hotpot device,
   in a network connection session,
      the in-vehicle device receiving the RSH beacon frame messages to detect the tagged information and extract the wireless network connection parameters, the information of current network condition and the identifier of the roadside hotpot device included in the tagged information,
      the in-vehicle device verifying support for wireless connection to the RSH by checking the wireless network connection parameters and the identifier of the roadside hotpot device, upon successful verification, the in-vehicle device cooperating with the roadside hotpot device to associate with the roadside hotspot device using an identifier of the in-vehicle device,
      the roadside hotpot device sending a confirmation message to the in-vehicle device to confirm successful authentication of the in-vehicle device, and
      upon receiving the confirmation message, the in-vehicle device setting up a wireless connection to the roadside hotspot device in accordance with the wireless network connection parameters and the information of current network condition already provided by and included in the tagged information received from the RSH prior to the network connection session.

2. The method of claim 1, wherein the wireless network connection parameters received in the RSH message include one or more network addresses and the method further comprises the steps of:
   the in-vehicle device selecting a network address during the network connection session from among the one or more network addresses, and
   the in-vehicle device connecting to the telecommunication network at the selected network address.

3. The method of claim 2, wherein the in-vehicle device selects the network address during the network connection session utilizing a unique identifier of the in-vehicle device.

4. The method of claim 2, wherein the in-vehicle device selects the network address during the network connection session utilizing a unique index received from the roadside hotspot device during the association step.

5. The method of claim 1, further comprising the steps of:
the in-vehicle device computing a value of a utility function based on the information of current network condition related to network transmission capacity, and
the in-vehicle device increasing its link rate of the wireless connection only if the computed value of the utility function indicates a network transmission capacity capable of supporting the increased link rate.

6. The method of claim 5, wherein the information of current network condition related to network transmission capacity include at least one of transmission bandwidth of the backhaul network, load of the roadside hotspot device, and cache status of transmission queue at the roadside hotspot device.

7. The method of claim 1, further comprising, after the connection between the RSD and the in-vehicle device being established in the network connection session:
the in-vehicle device categorizing and tagging outgoing data traffic according to tolerance to delayed transmission,
the in-vehicle device transmitting outgoing data traffic more tolerant to delay only after transmission of all outgoing data traffic less tolerant to delay being completed,
the roadside hotspot device mapping the tagged delay tolerance of the outgoing data traffic to priority values of network transmission, less delay tolerant being mapped to higher priority, and
the roadside hotspot device transmitting lower priority outgoing data traffic from the in-vehicle device only after transmission of all higher priority outgoing data traffic being completed.

8. The method of claim 7, wherein the roadside hotspot device assigns to returning data traffic to the in-vehicle device that corresponds to the outgoing data traffic the same priority and the same delay tolerance as that of the corresponding outgoing data traffic, and further comprising:
the roadside hotspot device transmitting lower priority returning data traffic to the in-vehicle device only after transmission of all higher priority returning data traffic being completed.

9. The method of claim 7, further comprising:
providing a gateway network interface of the in-vehicle device for connecting to a plurality of user devices in the vehicle to the network through the in-vehicle device.

10. The method of claim 1, wherein the in-vehicle device is an in-vehicle smart device that has a network interface for providing network connection to another user device inside the vehicle.

11. A method of a roadside hotspot device connecting an in-vehicle device to a telecommunication network that is connected to the roadside hotspot device, the method comprising the steps of the roadside hotspot device:
prior to receiving any request from the in-vehicle device, broadcasting beacon frame messages for reception by the in-vehicle device, the beacon frame messages including wireless network connection parameters, information of current network condition and identifier of the roadside hotpot device,
in a network connection session,
associating the in-vehicle device upon receiving an association request from the in-vehicle device, the association request including an identifier of the in-vehicle device,
authenticating the in-vehicle device upon receiving an authentication request from the in-vehicle device and sending a confirmation message to the in-vehicle device to confirm successful authentication,
establishing a wireless connection with the in-vehicle device in accordance with the wireless network connection parameters and the information of current network condition, already sent to the in-vehicle device prior to the network connection session and included in the beacon frame messages, to connect the in-vehicle device to the telecommunication network.

12. The method of claim 11, further comprising:
the roadside hotspot device sending a unique index to the in-vehicle device during association,
wherein the roadside hotspot device establishes the wireless connection with the in-vehicle device using a subset of the wireless network connection parameters determined by the in-vehicle device based on the unique index.

13. The method of claim 11, further comprising:
extracting a priority tag from data traffic received from the in-vehicle device and determining priority value associated with each data frame of the data traffic, and
transmitting data frames associated with lower priority value after completion of transmission of data frames associated with higher priority value that have been received by the roadside hotspot device.

14. A method of an in-vehicle device connecting to a telecommunication network through a roadside hotspot ("RSH") device connected to the telecommunication network, the method comprising the steps of:
prior to sending any connection request to the RSH, receiving RSH beacon frame messages broadcasted by the roadside hotspot device and extracting wireless network connection parameters, information of current network condition and identifier of the roadside hotpot device included in the RSH beacon frame messages,
in a network connection session,
verifying support for wireless connection to the RSH by checking the wireless network connection parameters and the identifier of the roadside hotpot device,
upon successful verification, cooperating with the roadside hotpot device to associate therewith using an identifier of the in-vehicle device,
transmitting an authentication request to the roadside hotspot device, and
upon receiving a confirmation message from the roadside hotpot device of successful authentication, setting up a wireless connection to the roadside hotspot device in accordance with the wireless network connection parameters and the information of current network condition already received in the RSH beacon frame messages prior to the network connection session.

15. The method of claim 14, wherein the wireless network connection parameters include a plurality of network addresses, and the method further comprising, during the network connection session:
selecting a network address from among the plurality of network addresses, wherein the in-vehicle device connects to the telecommunication network at the selected network address.

16. The method claim 14, wherein the wireless network connection parameters include a plurality of network addresses, and the method further comprising, during the network connection session:

extracting a unique index from association messages received from the roadside hotspot device during association, and determining a subset of wireless network connection parameters based on the unique index from the wireless network connection parameters included in the beacon frame messages, wherein the wireless connection is established using the subset of wireless network connection parameters.

17. The method of claim 14, further comprising the steps of:

computing a value of a utility function based on the information of current network condition related to network transmission capacity, and increasing link rate of the wireless connection only if the computed value of the utility function indicates a network transmission capacity capable of supporting the increased link rate.

18. The method of claim 14, further comprising the steps of:

categorizing and tagging outgoing data traffic according to tolerance to delayed transmission, and transmitting outgoing data traffic more tolerant to delay only after transmission of all outgoing data traffic less tolerant to delay being completed.

19. The method of claim 18, further comprising the steps of:

assigning a user priority value to the outgoing data traffic in accordance with a mapping scheme from delay tolerance to user priority, less delay tolerant being mapped to higher priority.

20. The method of claim 18, further comprising:

providing a gateway network interface of the in-vehicle device for connecting to a plurality of user devices in the vehicle to the network through the in-vehicle device.

* * * * *